United States Patent
Laban et al.

(10) Patent No.: US 12,536,385 B2
(45) Date of Patent: Jan. 27, 2026

(54) SYSTEMS AND METHODS FOR A READING AND COMPREHENSION ASSISTANCE TOOL

(71) Applicant: Salesforce, Inc., San Francisco, CA (US)

(72) Inventors: Philippe Laban, New York, NY (US); Chien-Sheng (Jason) Wu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 726 days.

(21) Appl. No.: 17/971,241

(22) Filed: Oct. 21, 2022

(65) Prior Publication Data

US 2023/0419048 A1 Dec. 28, 2023

Related U.S. Application Data

(60) Provisional application No. 63/393,732, filed on Jul. 29, 2022, provisional application No. 63/355,420, filed on Jun. 24, 2022.

(51) Int. Cl.
*G06F 40/40* (2020.01)
*G06F 3/04817* (2022.01)
(Continued)

(52) U.S. Cl.
CPC .......... *G06F 40/40* (2020.01); *G06F 3/04817* (2013.01); *G06F 16/3329* (2019.01);
(Continued)

(58) Field of Classification Search
CPC .. G06F 40/40; G06F 3/04817; G06F 16/3329; G06F 40/35; G06F 40/30; G06N 3/04; G06N 3/084
(Continued)

(56) References Cited

U.S. PATENT DOCUMENTS 9,454,281 B2 * 9/2016 Ward ................ G06F 16/24575
10,303,798 B2 * 5/2019 Stubley ............... G06F 16/3329
(Continued)

FOREIGN PATENT DOCUMENTS

CN 110659351 A * 1/2020 ......... G06F 16/3344
CN 111680135 A * 9/2020 ............. G06N 3/044

*Primary Examiner* — Edwin S Leland, III
(74) *Attorney, Agent, or Firm* — Haynes and Boone, LLP

(57) ABSTRACT

Embodiments described herein provide a method and system for generating a reading interface for a user. The method includes receiving a first text passage from a first data source and a second text passage from a second data source. The method also includes generating a candidate question relating to contents of the first and the second text passages. The method further includes generating a first answer to the candidate question and a second answer to the candidate question. The method further includes determining that the candidate question qualifies as a discord question when the first answer and the second answer are both available and exhibit semantic diversity. The method further includes constructing a reading interface comprising a first component displaying the discord question and one or more user-engageable components each displaying the first or the second answer and linking to the first or the second data source, respectively.

20 Claims, 12 Drawing Sheets

(51) Int. Cl.
  *G06F 16/3329* (2025.01)
  *G06F 40/35* (2020.01)
  *G06N 3/04* (2023.01)
  *G06N 3/084* (2023.01)
  *G06F 40/30* (2020.01)

(52) U.S. Cl.
  CPC .............. *G06F 40/35* (2020.01); *G06N 3/04* (2013.01); *G06N 3/084* (2013.01); *G06F 40/30* (2020.01)

(58) Field of Classification Search
  USPC ............................................................ 704/9
  See application file for complete search history.

(56) References Cited

U.S. PATENT DOCUMENTS

| | | | |
|---|---|---|---|
| 10,762,082 B2* | 9/2020 | Ackermann | G06F 16/9537 |
| 11,269,872 B1* | 3/2022 | Moo | G06F 16/243 |
| 11,720,634 B2* | 8/2023 | Mass | G06F 16/3329 |
| | | | 704/9 |
| 2016/0117393 A1* | 4/2016 | von Rickenbach | G06Q 30/06 |
| | | | 707/723 |
| 2016/0179934 A1* | 6/2016 | Stubley | G06F 16/243 |
| | | | 707/722 |
| 2020/0044993 A1* | 2/2020 | Wu | G06N 7/01 |
| 2020/0137000 A1* | 4/2020 | Wu | H04L 51/046 |
| 2022/0067486 A1* | 3/2022 | Klein | G06N 3/0455 |
| 2022/0292139 A1* | 9/2022 | Mass | G06F 16/3329 |
| 2023/0419048 A1* | 12/2023 | Laban | G06F 16/3329 |
| 2024/0428068 A1* | 12/2024 | Murakhovs'Ka | G06Q 30/0631 |

\* cited by examiner

| Model Name | MOCHA Test | AE Test | NAnCo Valid. | NAnCo Test |
|---|---|---|---|---|
| Rob-L-MNLI | 0.07 | 54.7 | 67.6 | 58.1 |
| Rob-L-VitC | -0.01 | 54.7 | 69.7 | 69.7 |
| BERT-STS | 0.70 | 80.0 | 84.7 | 73.3 |
| MPNet-all | 0.61 | 75.7 | 85.4 | 73.0 |
| LERC | 0.81 | 82.2 | 87.5 | 70.9 |
| Rob-L-MOCHA | 0.87 | 84.5 | 92.9 | 81.3 |
| Rob-L-AE | 0.61 | 89.9 | 73.5 | 64.6 |
| Rob-L-MOCHA-AE | 0.87 | 89.2 | 89.9 | 74.1 |

FIG. 11

| Model-Dataset | % Discord Questions | | | | |
|---|---|---|---|---|---|
| | How | Why | What | Who | Avg. |
| BART-SQuAD | 19 | 63 | 13 | 5 | 25.0 |
| T5-SQuAD | 12 | 63 | 18 | 8 | 25.3 |
| MixQG-SQuAD | 11 | 62 | 27 | 9 | 27.3 |
| BART-NewsQA | 3 | 68 | 38 | 7 | 29.0 |
| T5-NewsQA | 2 | 65 | 42 | 8 | 29.3 |
| MixQG-NewsQA | 6 | 66 | 42 | 8 | 30.5 |
| BART-Fairy | 31 | 54 | 60 | 3 | 37.0 |
| T5-Fairy | 42 | 63 | 58 | 6 | 42.3 |
| MixQG-Fairy | 33 | 61 | 49 | 11 | 38.5 |
| BART-Inqui | 43 | 65 | 42 | 13 | 40.8 |
| T5-Inqui | 46 | 58 | 43 | 14 | 40.3 |
| MixQG-Inqui | 37 | 50 | 34 | 13 | 33.5 |
| T5-Discord | 49 | 64 | 65 | 14 | 48.0 |
| Human Written | 73 | 87 | 66 | 27 | 63.0 |

FIG. 12

SYSTEMS AND METHODS FOR A READING AND COMPREHENSION ASSISTANCE TOOL

CROSS REFERENCE(S)

The instant application is a nonprovisional of and claims priority under 35 U.S.C. 119 to U.S. provisional application No. 63/355,420, filed Jun. 24, 2022, and to U.S. provisional application No. 63/393,732, filed Jul. 29, 2022, both of which are hereby expressly incorporated by reference herein in their entireties.

TECHNICAL FIELD

The embodiments relate generally to natural language processing and machine learning systems, and more specifically to systems and methods for generating a reading and comprehension assistance tool with discord questions.

BACKGROUND

News coverage often contains bias linked to the source of the content, and as many readers rely on few sources to get informed, readers risk exposure to such bias. Some news aggregators propose an engineering solution to the problem, offering news readers diverse source alternatives for any given topic. However, users of news aggregators interested in diverse coverage must invest more time and effort, reading through several sources and sifting through overlapping content to build an understanding of a story's coverage diversity.

Therefore, there is a need for a framework and an interface to present news diversity to readers without the readers spending too much time and effort.

BRIEF DESCRIPTION OF THE DRAWINGS

FIG. 11 provides data pots illustrating example performance of various answer consolidation models, according to one embodiment described herein.

FIG. 12 provides data plots illustrating example performance of various question generation models, according to one embodiment described herein.

Figure 1:
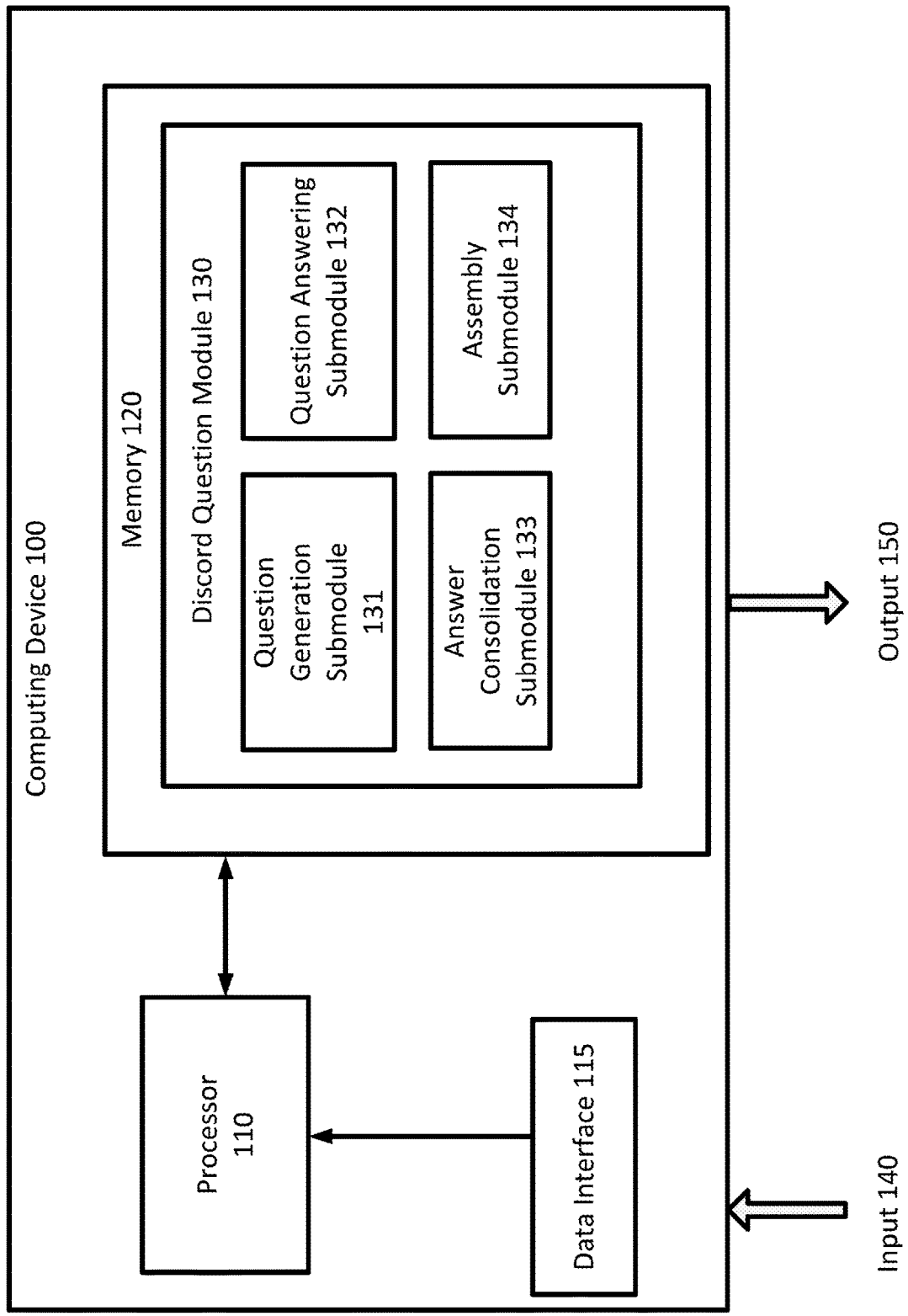
FIG. 1 is a simplified diagram illustrating a computing device implementing the discord question generation described in FIGS. 3A, 3B, 4-12, 13A, and 13B, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

News coverage can contain bias linked to the source of the content. As many readers rely on a few sources of news, these readers can be exposed to bias. Existing news aggregators can offer news readers diverse source alternatives for a given topic. However, the users of these news aggregators must invest an undesirably large amount of time and effort to read and sift through the news of various sources to understand a story's coverage diversity.

Existing methods to present coverage diversity include offering meta-data about the sources, article clustering, and topic-modeling-based approaches. However, source-based information can be overly generic. Article clustering and topic-modeling-based approaches can be complex for some users.

In view of the need for a news aggregator that can improve news diversity in multi-source settings, embodiments described herein provide a reading and comprehension tool that is built upon a discord question generation framework. The discord generation framework generates discord questions based on an input of a plurality of text passages. All of the text passages cover a same story, but each of the text passages is from a different source. The discord questions may be generated as questions that can be answered by most sources/text passages, and the answers to each discord question include semantic diversity to reflect the diverse perspectives of the different new sources.

In one embodiment, the discord question framework also generates answers to the discord questions. The discord question framework group the answers into semantic groups such that each semantic group includes answers that are semantically similar, and the answers in each semantic group is semantically different from the answers in another semantic group. Each answer in a semantic group is based on a different source. A reading and comprehension tool can thus generate a user interface widget that presents the discord questions, each paired with semantic groups of answers representing diverse content of different news source. The user interface widget may also include an engageable link paired with each answer, which, upon selection of a user, directs the user to the corresponding data source. In this way, the user interface widget provides a view showing how sources align for a specific issue in a story, and thus improves user experience in reading and comprehension of news.

In one embodiment, the discord question framework includes a question generation submodule, a question answering submodule, an answer consolidation submodule, and an assembly submodule. The question generation submodule employs a question generation model to generate a plurality of candidate questions based on the plurality of text passages. The question answering submodule employs a question answering model to generate, based on the plurality of text passages, a plurality of answers to each candidate question. The answer consolidation submodule employs an answer consolidation model to determine the candidate questions qualified as discord questions, and organize the answers to each discord question as semantic groups. In some embodiments, the answer consolidation submodule also separates candidate questions that are not qualified as discord questions using the answer consolidation model. For example, the answer consolidation submodule may determine these candidate questions as one of peripheral questions, consensus questions, and vague questions. The assembly submodule then generates an interface that presents the discord questions, the semantic groups of answers to each discord questions, and the sources linked to each answer. In some embodiments, the question generation model, the question answering model, and the answer consolidation model are separately trained an evaluated prior to the generation of the discord questions. In some embodiments, each of the question generation model, the question answering model, and the answer consolidation model includes a neural network. In an embodiment, a question answering evaluation model is used to as the answer consolidation model.

Computer and Network Environment

FIG. 1 is a simplified diagram illustrating a computing device implementing the discord question generation framework described in FIGS. 3A, 3B, 4-12, 13A, and 13B, according to one embodiment described herein. As shown in FIG. 1, computing device 100 includes a processor 110 coupled to memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a discord question module 130 that may be used to implement and/or emulate the systems and models, and/or to implement any of the methods described further herein. Discord question module 130 may receive input 140 such as text passages (e.g., a plurality of news articles) via the data interface 115 and generate an output 150 which may be an interface (e.g., an interface that presents discord question and semantic groups of answers to each discord question). Examples of input 140 may also include a summary of the text passages and a plurality of distractor text passages, and examples of output 150 may include one or more categories of candidate questions (e.g., discord questions, consensus questions, vague questions, and/or peripheral questions).

The data interface 115 may include a communication interface, a user interface (such as a voice input interface, a graphical user interface, and/or the like). For example, the computing device 100 may receive the input 140 (such as a plurality of text passages or a summary of the text passages) from a networked database via a communication interface. Or the computing device 100 may receive the input 140 from a user via the user interface.

In some embodiments, discord question module 130 is configured to be trained to generate discord questions and semantic groups of answers to the discord questions. Discord question module 130 may include a question generation submodule 131, a question answering submodule 132, an answer consolidation submodule 133, and an assembly submodule 134. Specifically, question generation submodule 131 is configured to train a question generation model, and to generate a plurality of candidate questions using the trained question generation model. Question answering submodule 132 is configured train a question answering model, and to generate a plurality of answers to each of the plurality of candidate questions using the trained question answering model. Answer consolidation submodule 133 is configured to train an answer consolidation model, and group the answers to the candidate questions into semantic groups. Answer consolidation submodule 133 is also trained to determine the discord questions from the candidate question based on the semantic groups. Assembly submodule 134 is configured to generate an interface that presents the discord questions, the semantic groups of answers related to each discord question, and the source linked to each answer. In one embodiment, discord question module 130 and its submodules 131-134 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
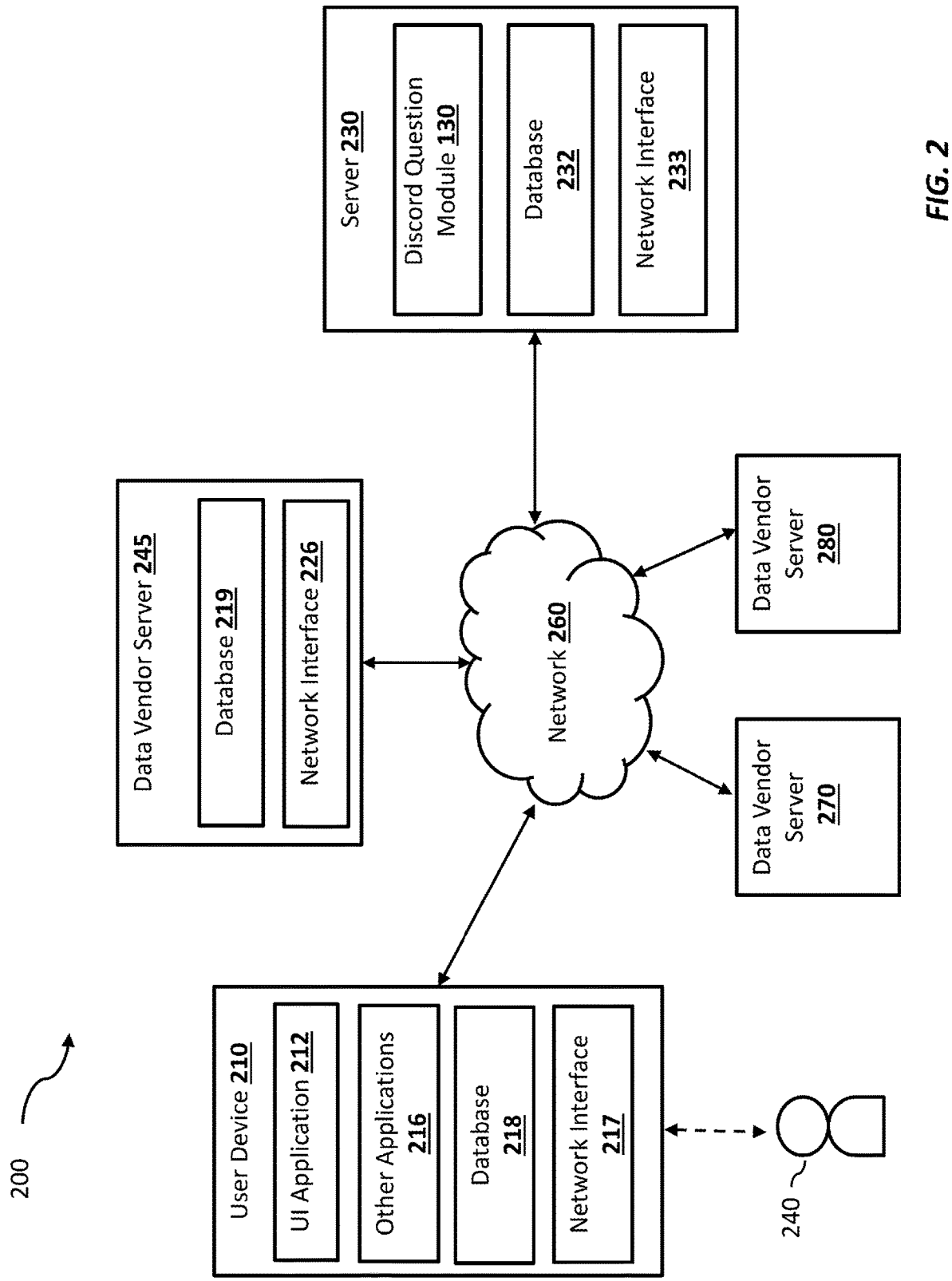
FIG. 2 is a simplified block diagram of a networked system suitable for implementing the discord question framework described in FIGS. 3A, 3B, and 4-12, 13A, and 13B and other embodiments described herein.

FIG. 2 is a simplified block diagram of a networked system suitable for implementing the post-editing framework described in FIGS. 3A, 3B, 4-2, 13A, and 13B and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of message communication devices may function similarly.

User device 210 of FIG. 2 contains a user interface (UI) application 212, and/or other applications 216, which may correspond to executable processes, procedures, and/or applications with associated hardware. For example, user device 210 may receive a message indicating the generation of an interface that presents the discord questions, semantic groups of answers to the discord questions, and sources linked to the answers from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a message of a revised summary from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the result of a training process and/or an output of the generated interface.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide input data such as text passages to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

Server 230 may be housed with discord question module 130 and its submodules described in FIG. 1. In some implementations, discord question module 130 may receive data from database 219 at the data vendor server 245 via the network 260 to generate an interface that presents discord questions, semantic groups of answers to the discord questions, and sources linked to the answers. The generated interface may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of discord question module 130. In one implementation, the database 232 may store previously generated discord questions and corresponding semantic groups of answers, training data for each model, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Example Workflows

Figure 3A:
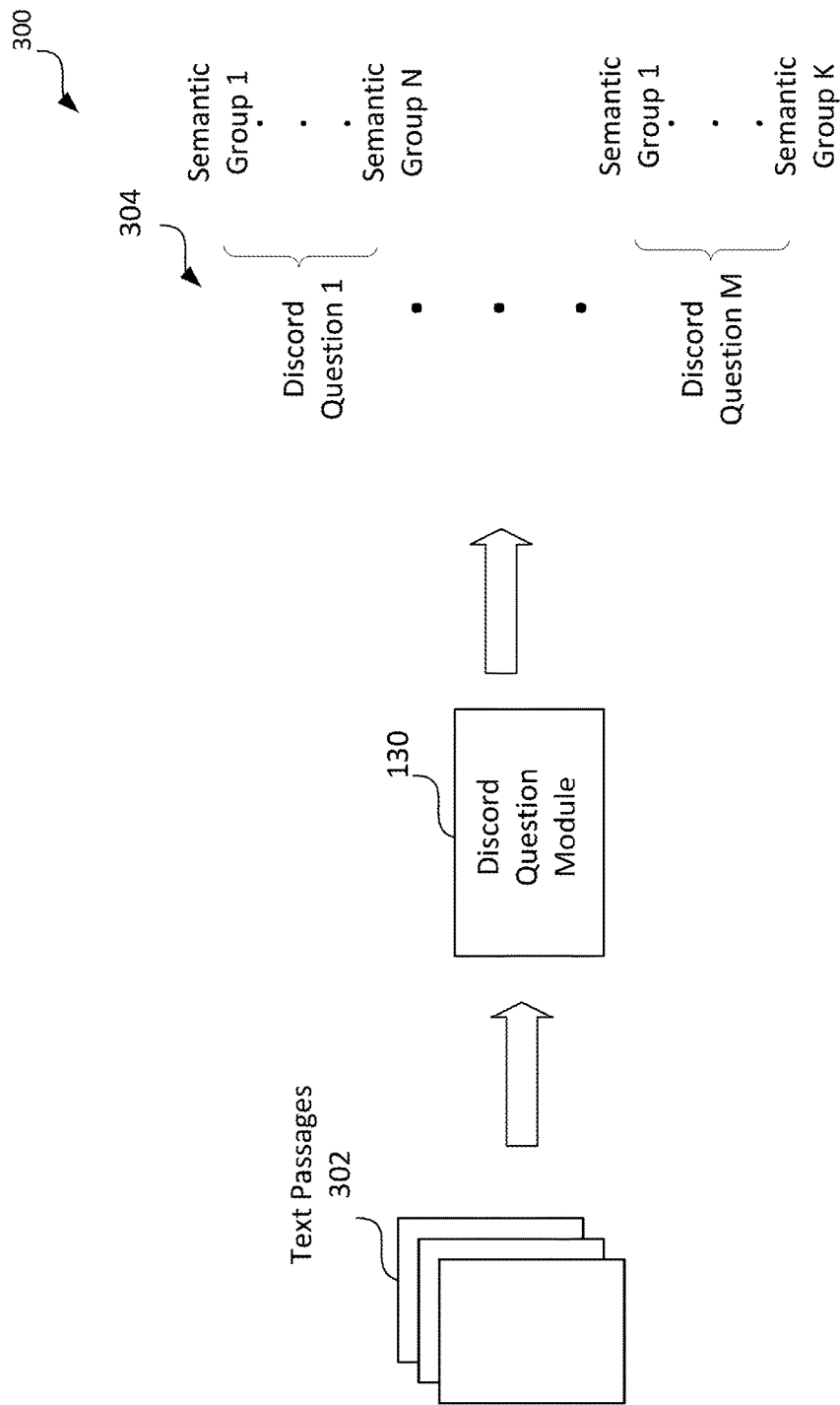
FIG. 3A is a simplified block diagram 300 illustrating discord question generation using an exemplary discord question framework, according to one embodiment described herein.

FIG. 3A shows an example block diagram 300 in which a discord question module 130 generates an output 304 of one or more discord questions in response to an input of one or more text passages 302, according to embodiments of the present disclosure. Discord question module 130 may also generate other categories of questions, which are not shown in FIG. 3A but illustrated in FIG. 7. Text passages 302 may include a plurality of descriptions/discussions of the same news story or same topic. Each text passage may be linked to a source. For example, text passages 302 may each be a news article covering the same news story (e.g., "Covid outburst in New York City), or a review on the same topic (e.g., "Covid vaccine mandate issue"). In some embodiments, text passages 302 may be news articles published around the same time and discuss a common event/story and set of entities. Individual news article (e.g., a text passage) of a news story are each published by a source. The source may be any media platform including any TV media (e.g., CNN, Fox News, NBC, etc.), print or digital media (e.g., New York Times, Guardian, Mail Online, etc.), social media (e.g., TikTok, Twitter, Facebook, Instagram, etc.), blogging service (e.g., Medium, arXiv, etc.), and/or any other alternative media, that often host the article on its distribution platform. A news article may include a headline, the article's content, and optionally a summary. In an embodiment, the collection of articles' contents as the full context of a story. In an embodiment, text passages 302 include at least ten text passages from different sources.

Discord question module 130 may include submodules that are previously trained and evaluated, and is conditioned to generate an output in response to an input. The input of discord question module 130 may include one or more text passages 302. Output 304 may include an interface that displays one or more discord questions 1-M (e.g., discord question 1, discord question 2, . . . , discord question M), with M being a positive integer greater than 1.

Each generated discord question 304 may be associated with a plurality of semantic groups of answers to the respective discord question. For example, a question answering module 132 (shown in FIG. 3B) generates a plurality of answers to each discord question based on different text passages 302. The plurality of answers are grouped into different sematic groups based on their respective semantic similarity. In this way, discord question 1 is related to semantic groups 1-N (e.g., semantic group 1, semantic group 2, . . . , semantic group N); and discord question M is related to semantic groups 1-K (e.g., semantic group 1, semantic group 2, . . . , semantic group K), with N and K each being a positive integer greater than or equal to 1 In an example, M, N, and K may each be a positive integer greater than 1. Answers in different semantic groups may be semantically different from one another. Each answer is linked to one of text passages 302 (e.g., one of the sources).

Specifically, to generate a successful discord question, two properties are considered, e.g., high coverage and answer diversity. In some embodiments, a discord question refers to a question to which (i) the answers can be provided by at least most (e.g., equal to or greater than 30% of) text passages 302 (or sources) and (ii) exhibit diversity (e.g., the largest semantic group of answers to the question includes no more than 70% of all answers). Questions that do not satisfy the high coverage condition are often considered as a "peripheral question," e.g., less than 30% of text passages 302 can provide an answer to such questions. An example peripheral question can be a question that's answered by 20% of text passages 302. Questions that do not satisfy the diversity condition are often considered as a "consensus question," e.g., the largest semantic group of answers to the question includes more than 70% of all answers. For example, a consensus question may be a factoid question such as "who is the president of X?"

For example, for question 1 to be qualified as a "discord question," the answers in semantic groups 1-N are generated by at least most (e.g., 30%) of text passage 302. Also, assuming semantic group 1 is the largest semantic group (e.g., containing the most answers), semantic group 1 should contain no more than 70% of all answers.

Figure 3B:
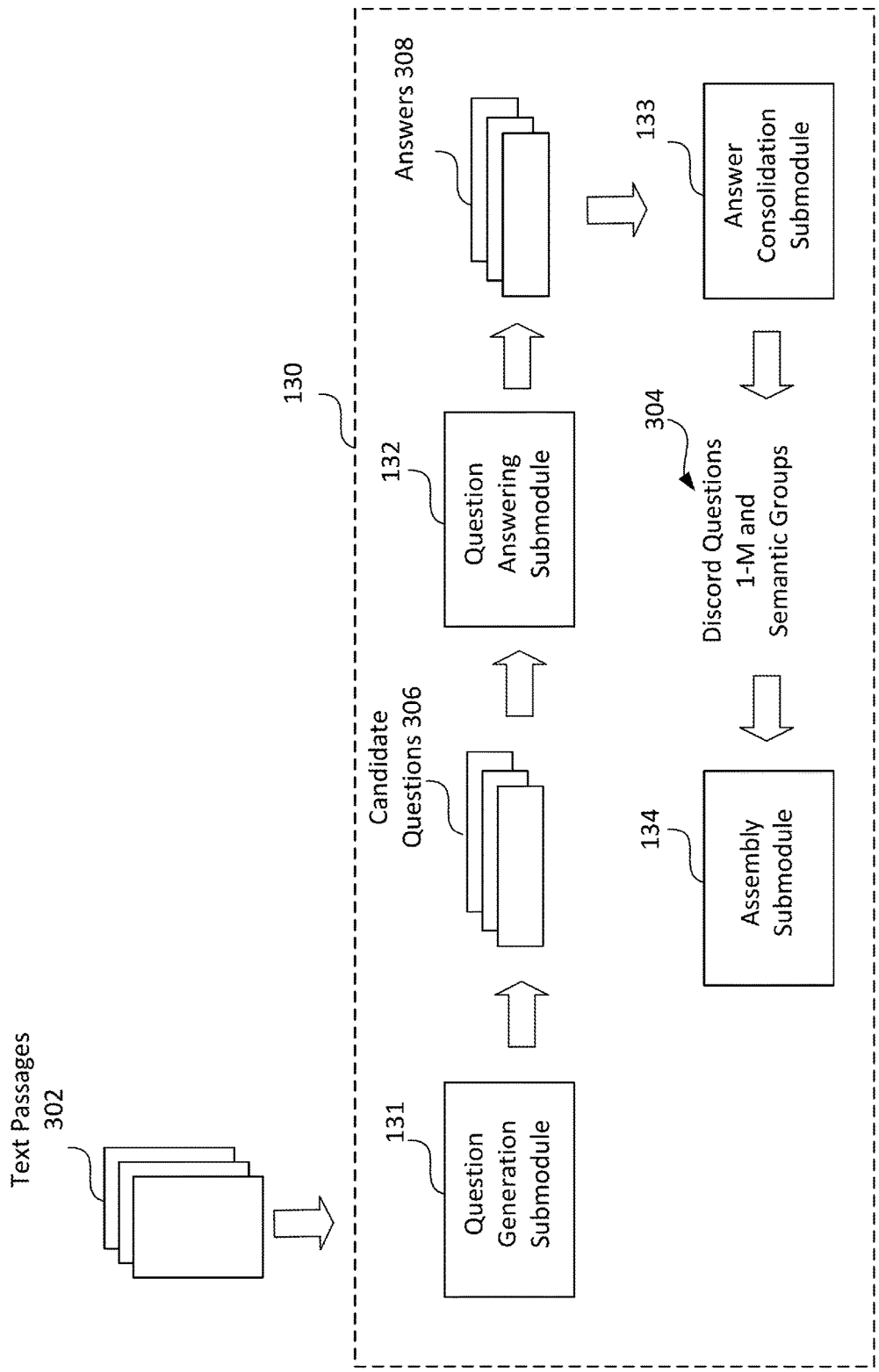
FIG. 3B is a simplified block diagram illustrating sub-modules in the discord question framework in FIG. 3A, according to one embodiment described herein.

FIG. 3B shows an example box diagram illustrating the submodules in discord question module 130, according to embodiments of the present disclosure. As shown in FIG. 3B, discord question module 130 may include a question generation submodule 131, a question answering submodule 132, an answer consolidation submodule 133, and an assembly submodule 134. Question generation submodule 131 may generate a plurality of candidate questions 306 in response to receiving text passages 302 as input. Question answering submodule 132 may generate answers 308 to each candidate questions 306 in response to receiving candidate questions 306 as input. Answer consolidation submodule 133 may generate discord questions 1-M and related semantic groups as output 304. Assembly submodule 134 may generate an interface that presents discord questions 1-M, semantic groups related to each one of discord questions 1-M, and the source linked to each answer.

Question generation submodule 131 may receive text passages 302 (e.g., news articles) and generate one or more candidate questions using any content of text passages 302 (or sources) via a question generation model (e.g., a trained question generation model). In some embodiments, a plurality of candidate questions 306 are generated. In some embodiments, the question generation model is a T5-Discord model trained on a combination of subsets of NewsQA, FairyTaleQA and InquisitiveQG. In an embodiment, the "How" questions are trained using InquisitiveQG, the "Why" questions are trained using NewsQA, the "What" questions are trained using FairyTaleQA, and the "Who" question are trained using InquisitiveQG. Upon receiving each of candidate questions 306, question answering submodule 132 may extract content from each of text passages 302 (e.g., sources), via a question answering model (e.g., a trained question answering model), as an answer to the candidate questions. The question answering model has been trained to extract, e.g., select spans of text, in the contents of text passages 302 that most directly answer the question without modification. When a text passage doesn't contain any answer to a candidate question, the question answering model does not generate answer from the text passage and may generate "No Answer" for the text passage. In an embodiment, each candidate question may be answered by one or more of text passages 302, and may thus have one or more answers each linked to a different source. In some embodiments, the question answering model is a RoBERTa-Large model trained on common extractive question answering datasets.

Answer consolidation submodule 133 may receive all of answers 308 and organize answers 308 of each candidate questions into semantic groups using an answer consolidation model (e.g., a trained answer consolidation model). For each candidate question, answers in the same semantic group are semantically similar, e.g., conveying similar opinion/content. For each candidate questions, answers in different semantic groups are semantically different, e.g., conveying different opinions/content. In an embodiment, semantic similarity may be determined based on a threshold similarity score. For example, a similarity score between any two of the answers in the same semantic group may be higher than or equal to the threshold similarity score, and a similarity score between any two of the answers in different semantic groups may be lower than the threshold similarity score.

Based on the semantic groups of answers related to respective candidate questions, answer consolidation model may also be trained to determine a portion of candidate questions 306 that are qualified as discord questions. In some embodiments, the answer consolidation model is trained to determine that a candidate question is qualified as a discord question when the answers to a candidate question is both available and exhibit diversity. In an embodiment, a candidate question is determined to be available when the answers to the candidate question is provided in greater than or equal to a first pre-defined percentage of text passages 302. In an embodiment, a candidate question is determined to be discord question when the largest semantic group related to the candidate question contains less than or equal to a second pre-defined percentage of all the answers to the candidate question. Covered by lower than the first pre-defined percentage of text passages 302, a candidate question may be considered not sufficiently available (e.g., a peripheral question). If the largest semantic group related to a candidate question contains more than the second pre-defined percentage of all the answers, the candidate question may not have sufficiently diverse answers (e.g., a consensus question). In an example, a candidate question is qualified as a discord question when the answers to the candidate question is provided by at least 30% of text passages 302 (e.g., sources) and the largest semantic group contains no more than 70% of all the answers to the candidate question.

The answer consolidation model 133 may also be trained to determine other categories of questions in candidate questions 306, based on the semantic groups of answers related to the candidate question. In some embodiments, a candidate question is determined to be a peripheral question when the answers to the candidate question is not available in at least the first pre-defined percentage of text passages 302 (e.g., sources). In some embodiments, a candidate question is determined to be a consensus question when the largest semantic group of answers contains greater than the second pre-defined percentage of text passages 302 (e.g., sources). In an example, the answers to a peripheral question are provided by less than 30% of text passages 302 (e.g., sources), and the largest semantic group related to a consensus question contains at least 70% of all the answers to the consensus question. In some embodiments, the answer consolidation model may also be trained to determine a vague question. For example, the input of discord question module 130 may include one or more distractor text passages in additional to text passages 302. A distractor text passage may be defined as a text passage that is published before (e.g., at least before a pre-determined time period such as a month) the text passages 302, and is thus not specific/relevant to the article story covered by text passages 302. In some embodiments, a specificity score is determined for a candidate question. Answer consolidation submodule 133 may compute the specificity score of the candidate question and compare the specificity score with a threshold value. If the specificity score is less than or equal to the threshold value, the answer consolidation model may determine the candidate question to be a vague question.

Figure 9:
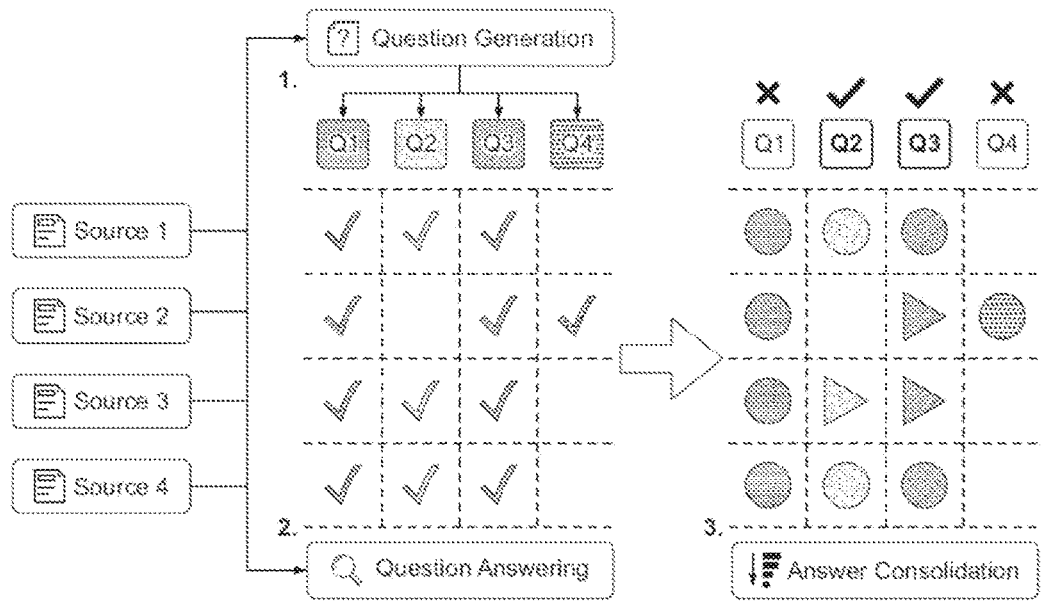
FIG. 9 provides data plots illustrating an example of the discord question framework, according to one embodiment described herein.

For example, FIG. 9 illustrates an overview of the disclosed discord question framework, according to some embodiments. In FIG. 9, out of the 4 candidate questions, only Q2 and Q3 satisfy both properties and are considered discord questions. Questions such as Q1—breaks property (2)—are labeled as consensus questions, as a majority of the sources' answers are in the same semantic group (i.e., circles). Factoid questions tend to be consensus questions (e.g., Who is the president of France?). Questions such as Q4—breaks property (1)—are labeled as peripheral questions, as a minority of sources answer the question. It is hypothesized that consensus and peripheral questions are not pertinent to the study of a story's coverage diversity, as they do not reveal dimensions of source discord.

Figure 10:
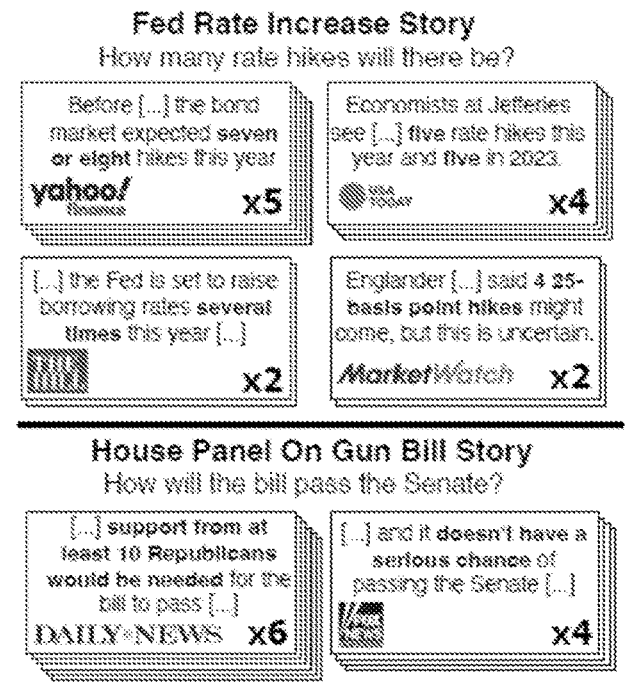
FIG. 10 illustrates an example of the discord questions for news coverage diversity, according to one embodiment described herein.

FIG. 10 presents two illustrative discord questions that were generated by the disclosed discord question framework, according to some embodiments. In the first example, the sources and experts make forecasts that are subjective and uncertain: in a story about the Federal Reserve's rate increase, news sources predict that anywhere between 4 and 8 hikes might happen in 2022. In the second example, in a story about the US House passing a bill about Gun Regulations, some sources chose to be more optimistic, focusing on how many Republicans were required for the bill to pass, while others employed a more pessimistic tone, writing that the bill did not have a serious chance to pass.

Figure 13B:
FIGS. 13A and 13B provide data plots illustrating prototype interfaces of discord questions, according to one embodiment described herein.
Figure 13A:

Referring back to FIG. 3B, assembly submodule 134 may generate an interface that presents discord questions 1-M, semantic groups of answers to discord questions 1-M, and the sources linked to each answer. In some embodiments, any other categories of questions, e.g., peripheral questions, consensus questions, and/or vague questions, are not shown in the interface. As an example, stories may be collected as they are added to a platform, e.g., Google News. The stories may be filtered to stories with at least 10 distinct sources. For each story, article content is obtained using the newspaper library. The disclosed discord questions pipeline/framework may be run. Several hundred candidate questions may be generated and may be filtered down to discord questions that receive highest source coverage. Two interfaces are designed to visualize the stories. FIGS. 13A and 13B respectively illustrate a Q&A view and a Grid view. In the Q&A view, the user sees a list of selected discord questions and a horizontal carousel with a representative answer from each semantic group of answers. Sources are linked explicitly to each answer, and the user can click to access the original article. In the Grid view, information is condensed into a matrix to facilitate comparison between sources: each row lists a question, each column represents a source, in each entry, a shape indicates whether a source answered a question, and the shape's pattern indicates the source's semantic group of answers.

Figure 4:
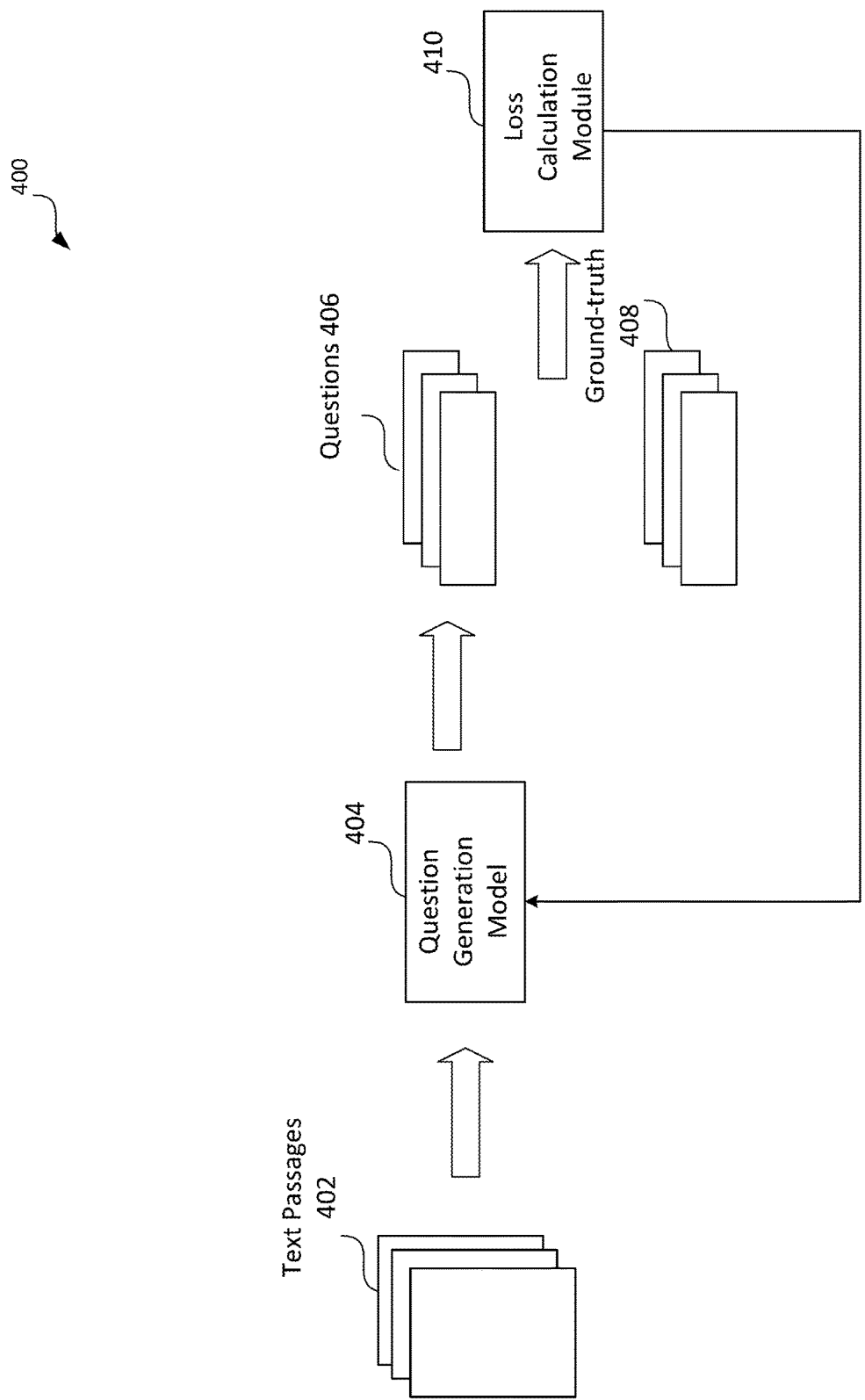
FIG. 4 is a simplified block diagram 400 illustrating a training of a question generation model of the discord question framework, according to one embodiment described herein.

In an embodiment, the question generation, the question answering model, and the answer consolidation model are separately trained prior to the process of generating discord questions shown in FIG. 3A. In some embodiments, each of the question generation, the question answering model, and the answer consolidation model includes a neural network. FIG. 4 shows an example block diagram 400 in which a question generation model 404 is trained to generate candidate questions 306, according to embodiments of the present disclosure. Question generation model 404 may be trained to generate candidate questions 306 used for the generation of the discord questions. In some embodiments, the training data of question generation model 404 includes one or more text passages 402 and ground-truth 408. Text passages 402 may describe/cover a same story/topic. Ground-truth 408 may be manually-created questions associated with the story/topic.

As shown in FIG. 4, for the training of question generation model 404, question generation model 404 may receive the training data (e.g., text passages 402 and ground truth 408). Text passages 402 may be fed to question generation model 404 as input. Question generation model 404 may generate one or more questions 406. For example, question generation model 404 may generate a predicted distribution of each token in the output question 406. Such distribution of the questions 406 may then be compared with ground-truth questions 408 that are associated with training passages 402 by a loss calculation module 410. Loss calculation module 410 may calculate a cross-entropy loss based on the difference between the predicted token (e.g., word token) distribution of questions 406 and the ground-truth questions 408. The computed cross-entropy loss is then used to update to question generation model 404 by backpropagation. In this way, the probability of P(Ground-truth 408|Text Passages 402) is maximized through the training of question generation model 404. In some embodiments, question generation model 404 may be trained to predict questions 406 that are sufficiently similar to ground-truth 408.

Figure 5:
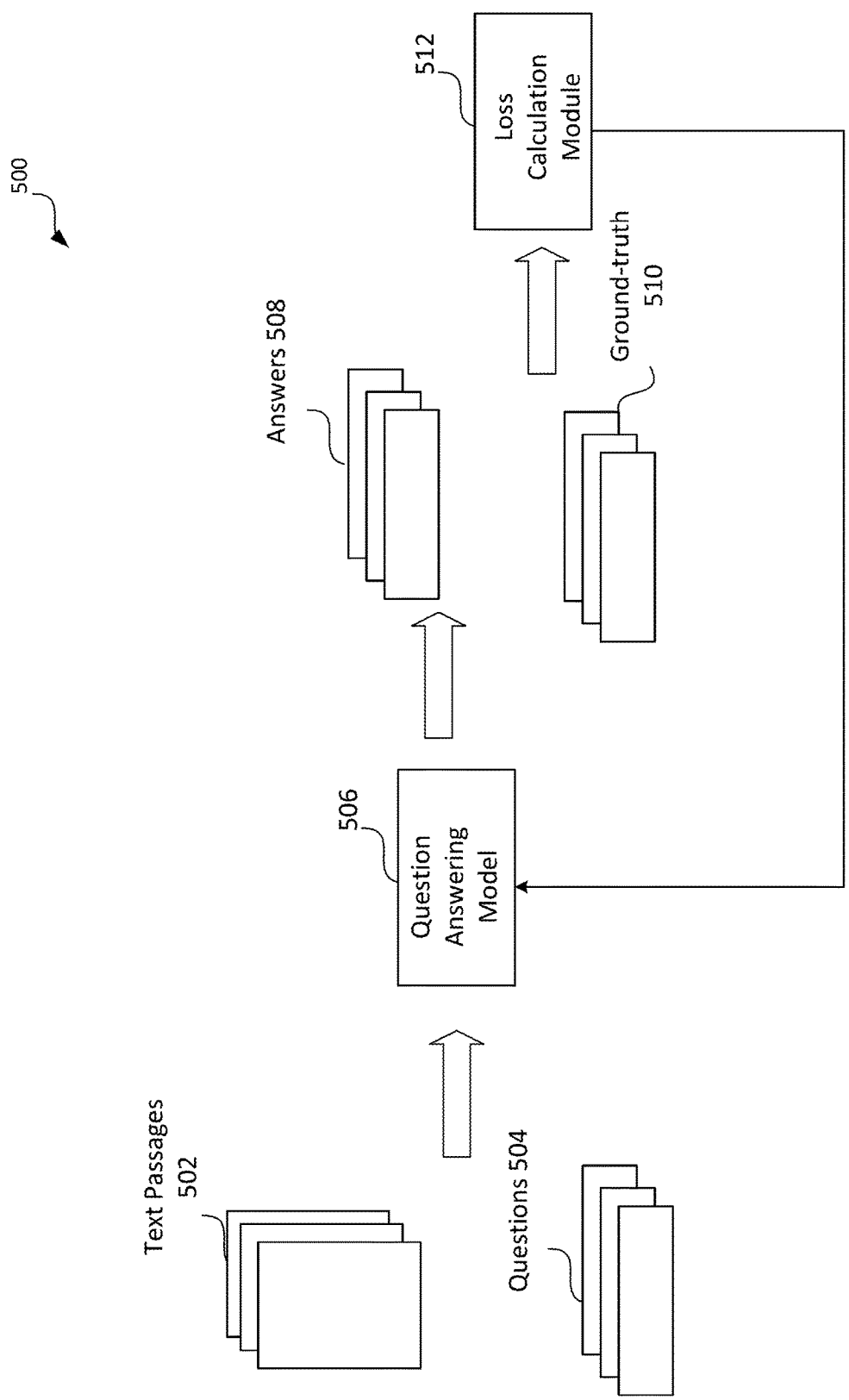
FIG. 5 is a simplified block diagram 500 illustrating a training of a question answering model of the discord question framework, according to one embodiment described herein.

FIG. 5 shows an example block diagram 500 in which a question answering model 506 is trained to generate answers to questions 504, according to embodiments of the present disclosure. Question answering model 506 may be trained to generate answers 508 to questions 504. After training, question answering model 506 may be used for the generation of answers to the candidate questions. In some embodiments, the training data of question answering model 506 includes one or more text passages 502, one or more questions 504, and ground-truth 510. Text passages 502 may describe/cover a same story/topic, and may be the same as or different from text passages 402. Ground-truth 510 may be manually-created answers to questions 504.

As shown in FIG. 5, for the training of question answering model 506, question answering model 506 may receive the training data (e.g., text passages 502, questions 504, and ground-truth 510). Text passages 502 and questions 504 may be fed to question answering model 506 as input. Question answering model 506 may generate one or more answers 508 to one or more questions 504. For each of questions 504, question answering model 506 may extract/select spans of text from each text passage 502 as answers to the question. Answers 508 may each include a direct answer to a question from a corresponding text passage 502 (e.g., from a corresponding source), without modification. If question answering model 506 fails to find answer in a text passage, question answering model 506 may generate a "No Answer" special token. For example, question answering model 506 may generate a token distribution of each of answers 508. Such distribution of the answers 508 may then be compared with ground-truth 510 (e.g., the token distribution of ground-truth 510) by a loss calculation module 512. Loss calculation module 512 may calculate a cross-entropy loss based on the difference between the predicted token (e.g., word token) distribution of answers 508 and the token distribution of ground-truth 510. The computed cross-entropy loss is then used to update to question answering model 506 by backpropagation. In this way, the probability of P(Ground-truth 510|Text Passages 502, Questions 504) is maximized through the training of question answering model 506. In some embodiments, question answering model 506 may be trained to predict answers 508 that are sufficiently similar to ground-truth 510.

Figure 6:
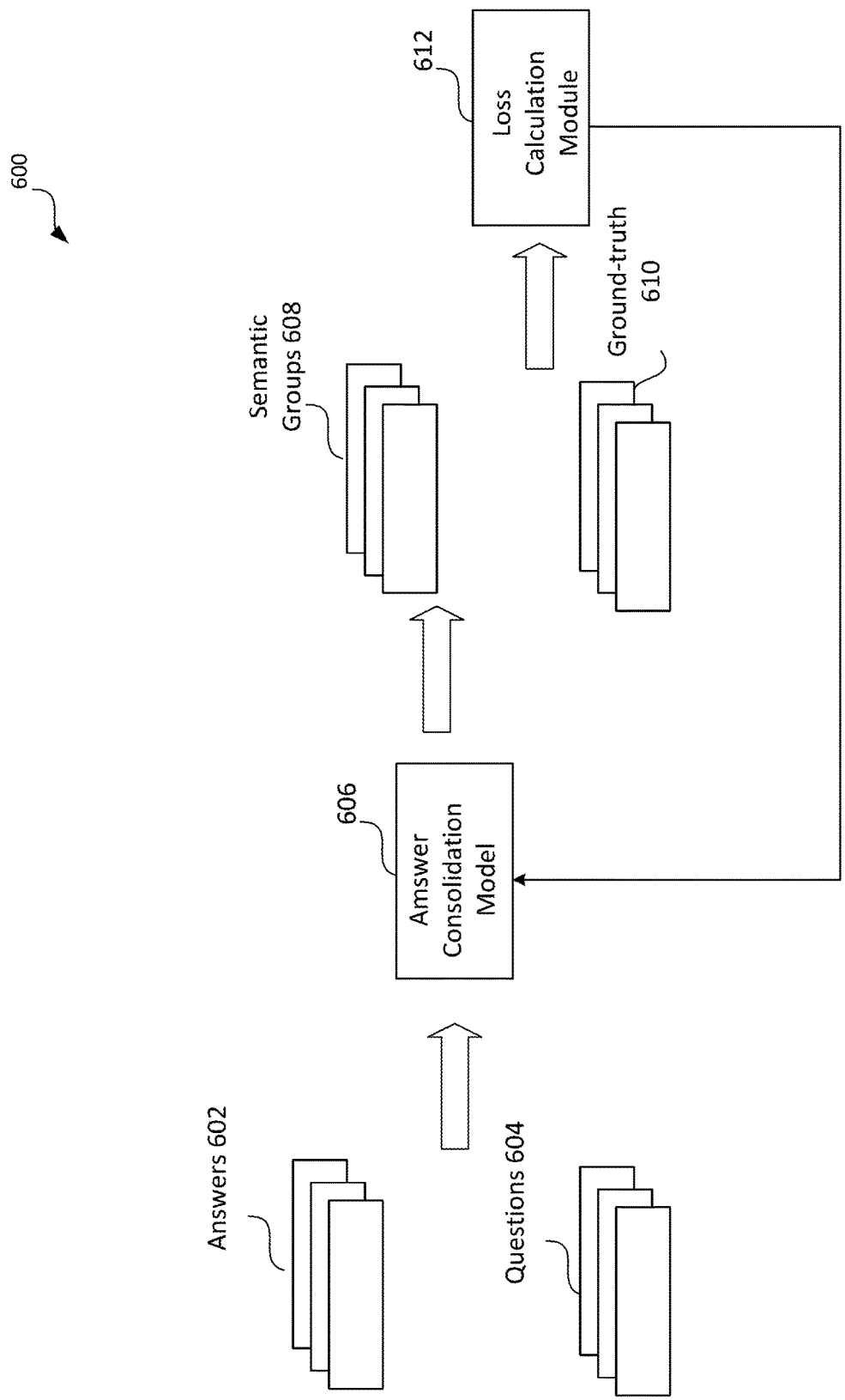
FIG. 6 is a simplified block diagram 600 illustrating a training of an answer consolidation model of the discord question framework, according to one embodiment described herein.

FIG. 6 shows an example block diagram 600 in which an answer consolidation model 606 is trained to generate semantic groups 608 to questions 604, according to embodiments of the present disclosure. Answer consolidation model 606 may be trained to organize/group answers 602 to semantic groups 608 to each of questions 604. After training, answer consolidation model 606 may be used for the grouping of answers of 602, for each of questions 604. In some embodiments, the training data of answer consolidation model 606 includes one or more answers 602, one or more questions 604, and ground-truth 610. Questions 604 may be the same as or different from questions 406 or 504. Ground-truth 610 may be manually-grouped answers to questions 604.

As shown in FIG. 6, for the training of answer consolidation model 606, answer consolidation model 606 may receive the training data (e.g., answers 602, questions 604, and ground-truth 610). Answers 602 and questions 604 may be fed to answer consolidation model 606 as input. Answer consolidation model 606 may group/organize answers 602 to generate one or more semantic groups 608. In some embodiments, each of questions 604 may correspond to one or more of semantic groups 608. In some embodiments, answers in the same semantic group may convey semantically similar answers, and answers in different semantic groups may convey semantically different answers. For example, answer consolidation model 606 may generate a token distribution of each of semantic groups 608. Such distribution of the semantic groups 608 may then be compared with ground-truth 610 (e.g., the token distribution of ground-truth 610) by a loss calculation module 612. Loss calculation module 612 may calculate a cross-entropy loss based on the difference between the predicted token (e.g., word token) distribution of semantic groups 608 and the token distribution of ground-truth 610. The computed cross-entropy loss is then used to update to answer consolidation model 606 by backpropagation. In this way, the probability of P(Ground-truth 610|Answers 602, Questions 604) is maximized through the training of answer consolidation model 606. In some embodiments, answer consolidation model 606 may be trained to predict semantic groups 608 that are sufficiently similar to ground-truth 610.

In some embodiments, to learn to organize the answers in to semantic groups, the answer consolidation model is trained to perform two sub-tasks: (1) answer pair similarity prediction (also answer equivalence equivalence), in which the answer consolidation model is tasked with assessing the similarity S12 between two answers (a1, a2) to a candidate question Q, (2) the consolidation step, in which given a set of answers (a1, a2, . . . , an) and all pair-wise similarities S12, S1$n$, S2$n$, . . . , the answer consolidation model may organize the answers into semantic groups. The method is described in Zhou et al., Answer Consolidation: Formulation and Benchmarking, 2022. Because answer-pair similarity can involve subjective opinion, a binary classification (Bulian et al., Tomayto, Tomahto, BeyondToken-Level Answer Equivalence For Question Answering Evaluation.) framing, as it simplifies annotation procedures, is adopted in the embodiments. In some embodiments, the answer consolidation is a question answering evaluation model disclosed in Chen (Mocha: A Dataset for Training and Evaluating Generative Reading Comprehension Metrics, Proceedings of the 2020 Conference on Empirical Methods in Natural Language Processing, 6521-6532.) In some embodiments, the answer consolidation model is a Rob-L-MOCHA model.

To facilitate experimentation, in some embodiments, the final group labels are converted into a binary classification task on pairs of answers. For each question, all pairs of answers are checked, and a label of 1 is assigned to a pair if the two answers in the pair are in the same global group, and 0 otherwise. In total, 3,267 pairs are obtained, with a class imbalance of 25% of positive pairs. The data collected is large enough for evaluation, but too small for model training. In some embodiments, the re-use of existing resources is explored to assess which transfers best to the experiment, specifically looking at models from NLI, sentence similarity, and answer equivalence. For NLI models, two models are explored: Rob-L-MNLI, a RoBERTa-Large model (Liu et al., Roberta: A Robustly Optimized Bert Pretraining Approach, 2019) trained on the popular MNLI dataset (Williams et al., Proceedings of the 2018 Conference of the North American Chapter of the Association for Computational Linguistics: Human Language Technologies, Volume 1, 1112-1122, 2018), and Rob-L-VitC trained on the more recent Vitamin C dataset (Schuster et al., Proceedings of the 2021 Conference of the North American Chapter of the Association for Computational Linguistics: Human Language Technologies, 624-643, 2021), which has shown promise in other semantic comparison tasks such as factual inconsistency detection (Laban et al., Summac: Re-visiting NLI-based Models for Inconsistency Detection in Summarization. Transactions of the Association for Computational Linguistics, 10:163-177, 2022). Model prediction is: $S_{NLI}(A1,A2)=P(E|A1,A2)-P(C|A1,A2)$, where $P(E| \ldots )$ and $P(C| \ldots )$ are model probabilities of the entailment and contradiction class. During validation, minor modifications such as a symmetric scoring, and using only $P(E| \ldots )$ had negligible influence on overall performance. Two sentence embeddings models are explored, selected on the Hugging Face model hub2 as strong performers on the Sentence Embedding Benchmark. First, BERT-STS, a BERT-base model (Devlin et al., Bert: Pre-training of Deep Bidirectional Transformers for Language Understanding, 2018) finetuned on the Semantic Text Similarity Benchmark (STS-B) (Cera et al., Semeval-2017 task I: Sematic Textual Similarity Multilingual and Cross-lingual Focused Evaluation). Second, MPNet-all, an MPNet-base model (Song et al., Mpnet: Masked and Permuted Pre-training for Language Understanding. Advances in Neural Information Processing Systems, 33: 16857-16867, 2020) trained on a large corpus of sentence similarity tasks (Reimers and Gurevych, Sentence-bert: Sentence Embeddings Using Siamese Bert-Networks, Proceedings of the 2019 Conference on Empirical Methods in Natural Language Processing, 2019). Further, four answer equivalence models are selected, in an embodiment. LERC is a BERT-base model introduced in Chen et al. (Mocha: A Dataset for Training and Evaluation Generative Reading Comprehension Metrics, Proceedings of the 2020 Conference on Empirical Methods in Natural Language Processing, 6521-6532, 2020). Rob-L-MOCHA, is a RoBERTa-Large model trained on MOCHA's regression task. Rob-L-AE, is a RoBERTa-Large model trained on the AE's classification task. The RobL-MOCHA-AE model is trained on a union of MOCHA and AE, and the classification labels to regression values (i.e., label 1 to value 5, label 0 to value 0) are adapted.

It is noted that not all models have access to the same input. NLI and Sentence Embeddings models are not trained on tasks that involve questions, and answer pairs are only provided for those models. Answer equivalence-based models see the question as well as the answer pair, as prior work has shown that it can improve performance (Chen et al., Mocha: A Dataset for Training and Evaluation Generative Reading Comprehension Metrics, Proceedings of the 2020 Conference on Empirical Methods in Natural Language Processing, 6521-6532, 2020). All models produce continuous values as predictions. The threshold for classification is selected on the validation set, and used on the test set to assess realistic performance. In FIG. 11, Pearson correlation scores for MOCHA, and balanced accuracy for AE and NAnCo to account for class imbalance, are reported. On all datasets, answer equivalence models per form best, followed by sentence embeddings models, and NLI models perform worst. Within answer equivalence models, Rob-L-MOCHA tops performance, outperforming both LERC—a smaller model trained on the same data—and AE-trained models. In an embodiment, it is hypothesized that the more precise granularity of MOCHA provides additional signals useful to our task. Surprisingly, training on the union of MOCHA and AE does not improve performance, hinting at differences between the datasets, and a closer resemblance of our task to MOCHA. All models see a decrease in performance when transitioning from validation to test settings. This drop in performance reflects the reality of using models in practice, in which a threshold must be selected in advance. Although a test balanced accuracy of 81.3% is far from errorless, the performance is encouraging and a Rob-L-MOCHA is used when assembling the disclosed discord question framework. In practice, for a set of answers to a question, Rob-L-MOCHA is run on all answer pairs, a graph is built based on predictions, and the Louvain clustering algorithm (Blondel et al., Fast Unfolding of Communities in Large Networks, Journal of Statistical Mechanics: Theory and Experiment, 2008) is run to obtain answer groups.

In some embodiment, the question generation model, the question answering model, and the answer consolidation model may be jointly trained. Text passages 402 and 502 may be the same, and may be associated with a ground-truth question for training. When jointly trained, a training objective based on the discord question and the ground-truth question is computed; and the question generation model, the question answering model, and the answer consolidation model are jointly updated in an end-to-end manner based on the training objective via backpropagation.

Figure 7:
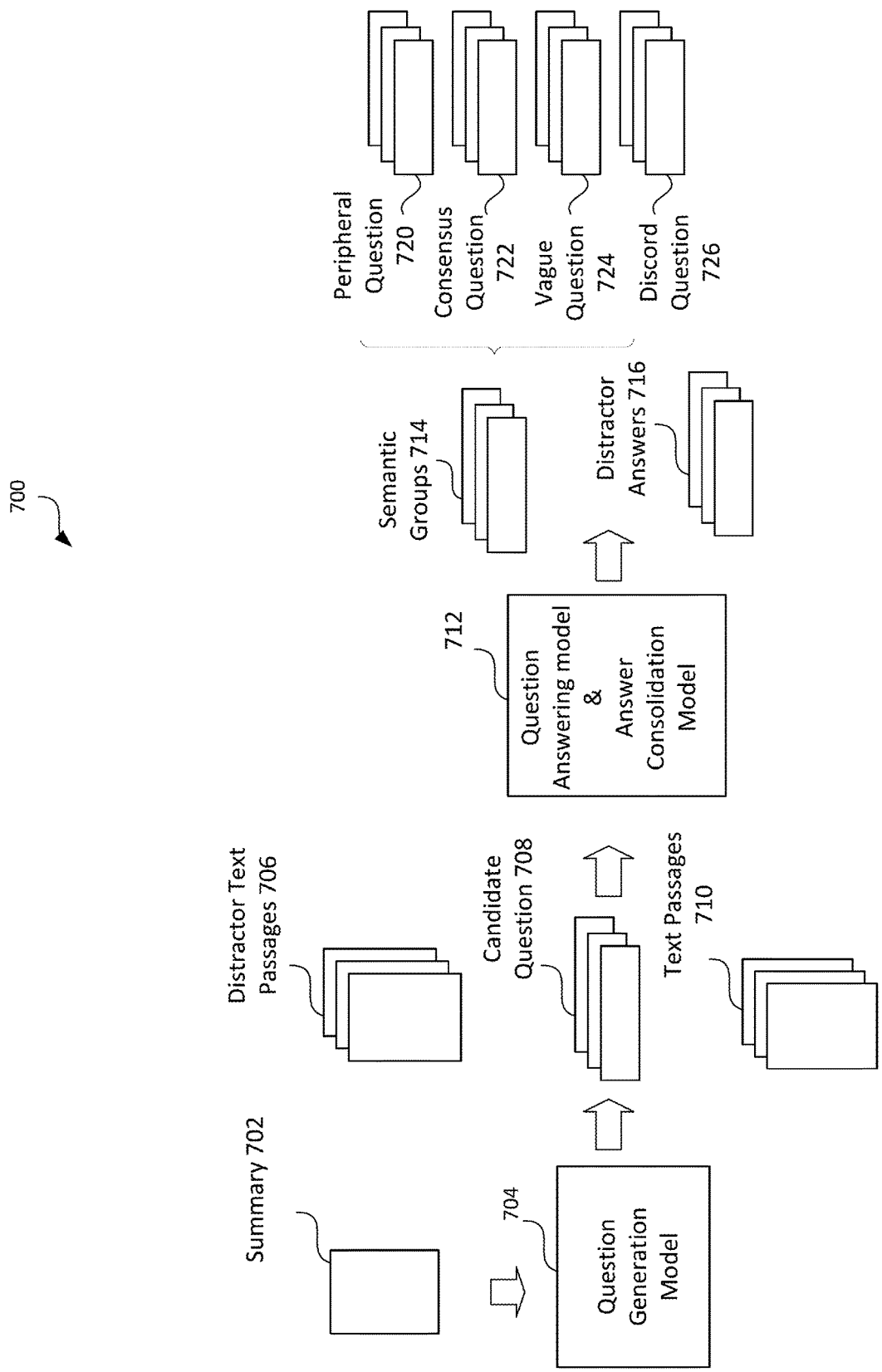
FIG. 7 is a simplified block diagram 700 illustrating an evaluation of a question generation model, according to one embodiment described herein.

FIG. 7 illustrates an example block diagram 700 in which the performance of the question generation model, the question answering model, and the answer consolidation model is evaluated, according to embodiments of the present disclosure. In some embodiments, a plurality of question generation models are evaluated, each using the process illustrated in FIG. 7. As shown in FIG. 7, after a question generation model 704 is trained, a summary 702 of a plurality of text passages 710 is inputted into question generation 704. In some embodiments, text passages 710 are not inputted into question generation model 704. Question generation model 704 may generate a candidate question 708 based on summary 702. Candidate question 708, text passages 710, and one or more distractor text passages 706 may be inputted into a question answering model to generate one or more answers, e.g., by extracting answers from text passages 710, to candidate question 708. Distractor text passages 706 may be different from text passages 710. For example, distractor text passage 706 may cover a different story, be published at a different time, etc. In some embodiments, text passages 710 include articles/text published at the same time (e.g., on the same date or in the same month), and distractor text passages 706 may each be published at a different time (e.g., outside of the time range of text passages 710). In some embodiments, the answers may include non-vague questions corresponding to (e.g., extracted from) text passages 710 and vague questions corresponding to (e.g., extracted from) distractor text passages 706. The answers and candidate question 708 may be inputted into an answer consolidation model, which organizes the non-vague answers into semantic groups 714 and separates semantic groups 714 from distractor answers 716. For ease of illustration, the question answering model and the answer consolidation model are together referred as element 712.

In some embodiments, the discord question framework (or the answer consolidation model) may determine a vague question. For example, the input of the question answering model may include one or more distractor text passages 706, which are different from text passages 710. A distractor passage may be not specific/relevant to the article story and is thus different from text passages 710. When generating answers to a candidate question, the question answering submodule may also extract content from each distractor article. In some embodiments, a specificity score of the candidate question is determined. The answer consolidation submodule may determine $A_{dis}$ as the number of distractor answers (e.g., all answers to the candidate question from the distractor text passages), A as representing the number of all answers (e.g., 308), and e being equal to 0.001. A specificity score is determined as $$Spec(Q, A, A_{dis}) = \frac{|A|}{|A_{dis}| + \epsilon}.$$

If the number of distractor answers is small, the specificity score is large. If Spec (Q, A, $A_{dis}$)≤2, the candidate question may be determined as a vague question.

If no answer is extracted from text passages 710 or the answers were extracted from fewer than a pre-determined percentage (e.g., 30%) of text passages 710, the answer consolidation model may label candidate question 708 as a peripheral question 720. If a single one of semantic groups 714 includes at least a pre-determined percentage (e.g., 70%) of all the answers, the answer consolidation model may label candidate question 708 as a consensus question 722. If the specificity score of candidate question 708 is less than or equal to a pre-determined number (e.g., 2), answer consolidation model may label candidate question 708 as a vague question 724. In some embodiments, the answer consolidation model may label candidate question 708 as a discord question 726 if candidate question 708 is not a peripheral question 720, a consensus question 722, or a vague question 724.

In an embodiment, three question generation models are evaluated in an experiment: BART-large, T5-large (Raffel et al., Exploring the Limits of Transfer Learning with a Unified Text-to-Text Transformer, 2020), and MixQG-large (Murakhovs'ka et al., Mixqg: Neural Question Generation with Mixed Answer Types, Findings of the North American Chapter of the Association for Computational Linguistics: NAACL, 2022), a model designed for QG. Each of the models may be finetuned on four datasets: SQuAD, NewsQA, FairyTaleQA (Xu et al., Fantastic Questions and Where to Find Them: Fairytaleqa—An Authentic Dataset for Narrative Comprehension, Proceedings of the 60$^{th}$ Annual Meeting of the Association for Computational Linguistics, Vol. 1: 447-460, 2022) which has narrative comprehension questions, and InquisitiveQG (Ko et al., Inquisitive Question Generation for High Level Text Comprehension, Proceedings of the 2020 Conference on Empirical Methods in Natural Language Processing, 6544-6555, 2020) which collected questions readers think of while reading. A confounding factor in QG may be the choice of start word. Start words may affect the difficulty of generating discord questions, with a difference between words that more often lead to factoid questions (e.g., Where), or reasoning starting words (e.g., Why). A model that generates a larger fraction of Why questions might be advantaged, regardless of its ability on all start words. To counter the start word's effect, models are enforced to be compared using the same start words. For each of the 200 test stories, models generate one question for four start words: Why, How, What, and Who (Where and When are skipped as they are related to a very low percentage of discord questions), for a total of 800 candidate questions. To understand task feasibility, human-generated discord questions are collected. A candidate discord question is manually written for each story and start word combinations. The candidate discord question can serve as a rough estimate of human performance.

Results for QG models and human performance in FIG. 12. Overall, human performance outperforms models by a large margin for all start words. As expected, the start word affects task difficulty, with discord percentages lower for Who questions, even in the human-written condition. The dataset influences performance more than model choice, and in particular different datasets lead to the best performance on different start words. For example, NewsQA models achieve the highest performance on the Why questions, Fairy-Tale models on the What questions, and Inquisitive models on the How and Who questions. This insight leads to aggregate a Discord dataset by concatenating: (Inqui/How, NewsQA/Why, FairyTale/What, and Inqui/Who). A T5-large model is trained on Discord, and the highest overall performance of 48% discord questions generated is achieved. The result is improved by 5.7%, even though performance still lags human written questions by around 15%.

Figure 8:
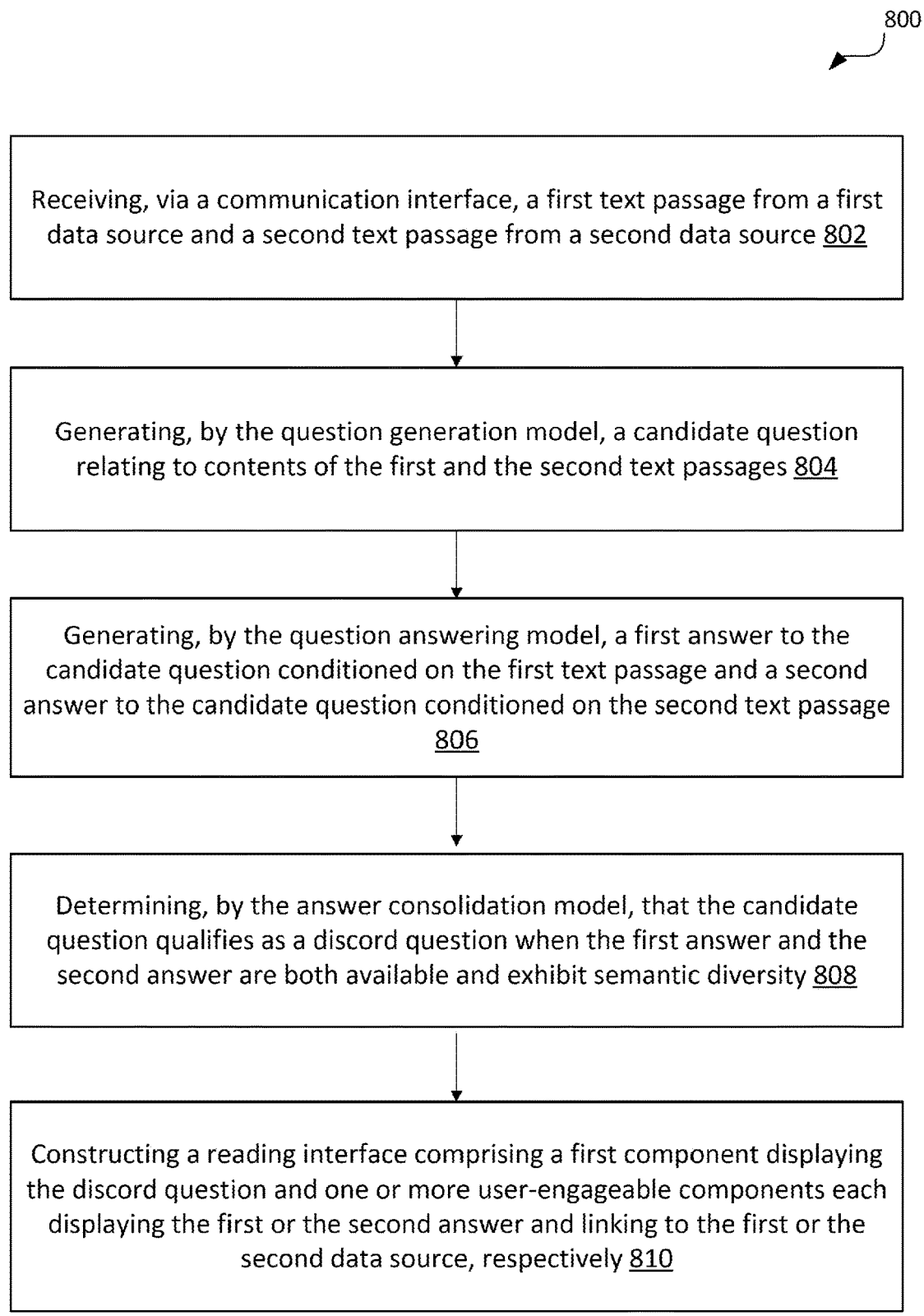
FIG. 8 provides a simplified logic flow diagram illustrating a method of discord question generation, according to some embodiments described herein.

FIG. 8 is an example logic flow diagram illustrating a method of discord question generation based on the framework shown in FIGS. 3A, 3B, 4-12, 13A, and 13B, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of discord question module 130 (e.g., FIGS. 1-2) that performs discord question generation.

At step 802, a first text passage (e.g., 302) and a second text passage (e.g., 302) are received via a communication interface (e.g., 115), respectively from a first data source (e.g., FIGS. 10, 13A) and a second data source (e.g., FIGS. 10, 13A).

At step 804, a candidate question (e.g., 306) relating contents of a first passage and a second passage (e.g., 302) is generated by a question generation model (e.g., 404). The first passage and the second passage may be received by a data interface.

At step 806, a first answer (e.g., 308) to the candidate question (e.g., 306) conditioned on the first text passage (e.g., 302), and a second answer (e.g., 308) to the candidate question conditioned on the second text passage (e.g., 302) are generated by a question answering model (e.g., 506).

At step 808, the candidate question is determined, by an answer consolidation model (e.g., 606), to be qualified as a discord question (e.g., 304, 726) when the first answer and the second answer are both available and exhibit semantic diversity.

At step 810, a reading interface (e.g., FIGS. 13A and 13B) is constructed. The reading interface includes a first component displaying the discord question and one or more user-engageable component each displaying the first or the second answer (e.g., FIGS. 13A and 13B) and linking to the first or the second data source, respectively.

In one implementation, the method further includes generating, by the question answering model, a plurality of answers to the candidate question based on relevant text passages, respectively. The method may also include determining, by the answer consolidation model, a first semantic group of semantically similar answers and a second semantic group of semantically similar answers. A similarity score between two of the semantically similar answers in a same semantic group is higher than a threshold score. In one implementation, the question generation model, the question answering model, and the answer consolidation model are each trained separately. In one implementation, the first text passage and the second text passage are associated with a ground-truth question for training, and wherein the question generation model, the question answering model, and the answer consolidation model are jointly trained. When jointly trained, the training may include computing a training objective based on the discord question and the ground-truth question; and jointly updating the question generation model, the question answering model, and the answer consolidation model in an end-to-end manner based on the training objective via backpropagation.

In one implementation, wherein an operation of determining, by the answer consolidation model, that the candidate question qualifies as a discord question includes determining that each answer from the plurality of answers comprises content for more than a first pre-defined percentage of a corresponding text passage based on which each answer is generated. In one implementation, an operation of determining, by the answer consolidation model, that the candidate question qualifies as a discord question includes determining that a larger one of the first sematic group and the second semantic group contains less than or equal to a second pre-defined percentage of the plurality of answers.

In one implementation, an operation of determining, by the answer consolidation model, that the candidate question qualifies as a discord question includes obtaining one or more distractor text passages that are different from the first text passage or the second text passage. The operation may also include generating, by the question answering model, one or more answers to the candidate question based on the one or more distractor text passages, respectively. The operation may further include computing a question specificity score based on a number of available answers generated from distractor text passages and a number of the plurality of answers generated from relevant text passages. The operation may further include determining that the question specificity score is greater than a pre-defined threshold.

In one embodiment, an operation further includes obtaining a summary text relating to the first text passage and the second text passage. Generating, by the question generation model, a candidate question relating to contents of the first and the second text passages may include generating the candidate question based on the summary text.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A system for generating a reading interface for a user, the system comprising:
    a data interface that receives a first text passage from a first data source and a second text passage from a second data source;
    a memory storing a question generation model, a question answering model and an answer consolidation model that are implemented on one or more neural networks, and a plurality of processor-executable instructions for operating the models; and
    a processor executing instructions to perform operations comprising:
        generating, by the question generation model, a candidate question relating to contents of the first and the second text passages;
        generating, by the question answering model, a first answer to the candidate question conditioned on the first text passage and a second answer to the candidate question conditioned on the second text passage;
        determining, by the answer consolidation model, that the candidate question qualifies as a discord question when the first answer and the second answer are both available and exhibit semantic diversity; and
        constructing a reading interface comprising a first component displaying the discord question and one or more user-engageable components each displaying the first or the second answer and linking to the first or the second data source, respectively; and a hardware user interface that presents the reading interface to a user.

2. The system of claim 1, wherein the operations further comprise:
    generating, by the question answering model, a plurality of answers to the candidate question based on relevant text passages, respectively; and
    determining, by the answer consolidation model, a first semantic group of semantically similar answers and a second semantic group of semantically similar answers, wherein a similarity score between two of the semantically similar answers in a same semantic group is higher than a threshold score.

3. The system of claim 2, wherein an operation of determining, by the answer consolidation model, that the candidate question qualifies as a discord question comprises:
    determining that each answer from the plurality of answers comprises content for more than a first pre-defined percentage of a corresponding text passage based on which each answer is generated.

4. The system of claim 2, wherein an operation of determining, by the answer consolidation model, that the candidate question qualifies as a discord question comprises:
    determining that a larger one of the first sematic group and the second semantic group contains less than or equal to a second pre-defined percentage of the plurality of answers.

5. The system of claim 2, wherein an operation of determining, by the answer consolidation model, that the candidate question qualifies as a discord question comprises:
    obtaining one or more distractor text passages that are different from the first text passage or the second text passage;
    generating, by the question answering model, one or more answers to the candidate question based on the one or more distractor text passages, respectively;
    computing a question specificity score based on a number of available answers generated from distractor text passages and a number of the plurality of answers generated from relevant text passages;
    determining that the question specificity score is greater than a pre-defined threshold.

6. The system of claim 2, further comprising an operation of obtaining a summary text relating to the first text passage and the second text passage, wherein
    generating, by the question generation model, a candidate question relating to contents of the first and the second text passages comprises generating the candidate question based on the summary text.

7. The system of claim 1, wherein the question generation model, the question answering model, and the answer consolidation model are each trained separately.

8. The system of claim 1, wherein the first text passage and the second text passage are associated with a ground-truth question for training, and wherein the question generation model, the question answering model, and the answer consolidation model are jointly trained, by:
    computing a training objective based on the discord question and the ground-truth question; and
    jointly updating the question generation model, the question answering model, and the answer consolidation model in an end-to-end manner based on the training objective via backpropagation.

9. A method for generating a reading interface for a user, the method comprising:
    receiving, via a communication interface, a first text passage from a first data source and a second text passage from a second data source;
    generating, by the question generation model, a candidate question relating to contents of the first and the second text passages;
    generating, by the question answering model, a first answer to the candidate question conditioned on the first text passage and a second answer to the candidate question conditioned on the second text passage;
    determining, by the answer consolidation model, that the candidate question qualifies as a discord question when the first answer and the second answer are both available and exhibit semantic diversity; and
    constructing a reading interface comprising a first component displaying the discord question and one or more user-engageable components each displaying the first or the second answer and linking to the first or the second data source, respectively.

10. The method of claim 9, further comprise:
generating, by the question answering model, a plurality of answers to the candidate question based on relevant text passages, respectively; and
determining, by the answer consolidation model, a first semantic group of semantically similar answers and a second semantic group of semantically similar answers,
wherein a similarity score between two of the semantically similar answers in a same semantic group is higher than a threshold score.

11. The method of claim 10, wherein determining, by the answer consolidation model, that the candidate question qualifies as a discord question comprises:
determining that each answer from the plurality of answers comprises content for more than a first pre-defined percentage of a corresponding text passage based on which each answer is generated.

12. The method of claim 10, wherein determining, by the answer consolidation model, that the candidate question qualifies as a discord question comprises:
determining that a larger one of the first sematic group and the second semantic group contains less than or equal to a second pre-defined percentage of the plurality of answers.

13. The method of claim 10, wherein determining, by the answer consolidation model, that the candidate question qualifies as a discord question comprises:
obtaining one or more distractor text passages that are different from the first text passage or the second text passage;
generating, by the question answering model, one or more answers to the candidate question based on the one or more distractor text passages, respectively;
computing a question specificity score based on a number of available answers generated from distractor text passages and a number of the plurality of answers generated from relevant text passages;
determining that the question specificity score is greater than a pre-defined threshold.

14. The method of claim 10, further comprising obtaining a summary text relating to the first text passage and the second text passage, wherein
generating, by the question generation model, a candidate question relating to contents of the first and the second text passages comprises generating the candidate question based on the summary text.

15. The method of claim 9, wherein the question generation model, the question answering model, and the answer consolidation model are each trained separately.

16. The method of claim 9, wherein the first text passage and the second text passage are associated with a ground-truth question for training, and wherein the question generation model, the question answering model, and the answer consolidation model are jointly trained, by:
computing a training objective based on the discord question and the ground-truth question; and
jointly updating the question generation model, the question answering model, and the answer consolidation model in an end-to-end manner based on the training objective via backpropagation.

17. A non-transitory processor-readable storage medium storing a plurality of processor-executable instructions for code program synthesis for a target problem, the instructions being executed by one or more hardware processors to perform operations comprising:
receiving, via a communication interface, a first text passage from a first data source and a second text passage from a second data source;
generating, by the question generation model, a candidate question relating to contents of the first and the second text passages;
generating, by the question answering model, a first answer to the candidate question conditioned on the first text passage and a second answer to the candidate question conditioned on the second text passage;
determining, by the answer consolidation model, that the candidate question qualifies as a discord question when the first answer and the second answer are both available and exhibit semantic diversity; and
constructing a reading interface comprising a first component displaying the discord question and one or more user-engageable components each displaying the first or the second answer and linking to the first or the second data source, respectively.

18. The non-transitory processor-readable storage medium of claim 17, wherein the operations further comprise:
generating, by the question answering model, a plurality of answers to the candidate question based on relevant text passages, respectively; and
determining, by the answer consolidation model, a first semantic group of semantically similar answers and a second semantic group of semantically similar answers,
wherein a similarity score between two of the semantically similar answers in a same semantic group is higher than a threshold score.

19. The non-transitory processor-readable storage medium of claim 18, wherein determining, by the answer consolidation model, that the candidate question qualifies as a discord question comprises:
determining that each answer from the plurality of answers comprises content for more than a first pre-defined percentage of a corresponding text passage based on which each answer is generated.

20. The non-transitory processor-readable storage medium of claim 18, wherein determining, by the answer consolidation model, that the candidate question qualifies as a discord question comprises:
determining that a larger one of the first sematic group and the second semantic group contains less than or equal to a second pre-defined percentage of the plurality of answers.

* * * * *